(12) United States Patent
Wang

(10) Patent No.: US 11,100,735 B2
(45) Date of Patent: Aug. 24, 2021

(54) METHOD AND APPARATUS FOR CONTROLLING ENTRANCE GUARD

(71) Applicant: Beijing Xiaomi Mobile Software Co., Ltd., Beijing (CN)

(72) Inventor: Peng Wang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/692,437

(22) Filed: Nov. 22, 2019

(65) Prior Publication Data
US 2021/0035389 A1    Feb. 4, 2021

(30) Foreign Application Priority Data

Jul. 29, 2019  (CN) .......................... 201910689792.0

(51) Int. Cl.
*G07C 9/00* (2020.01)

(52) U.S. Cl.
CPC ............... *G07C 9/00309* (2013.01); *G07C 2009/00476* (2013.01)

(58) Field of Classification Search
CPC .................. G07C 9/00309; G07C 2009/00476
See application file for complete search history.

(56) References Cited

U.S. PATENT DOCUMENTS

| 9,672,674 B2 | 6/2017 | Meganck et al. |
| 9,912,659 B1 | 3/2018 | Widdows |
| 2010/0046553 A1 | 2/2010 | Daigle et al. |
| 2017/0053467 A1* | 2/2017 | Meganck .......... G07C 9/00563 |

FOREIGN PATENT DOCUMENTS

| CN | 101197665 A | 6/2008 |
| CN | 101778381 A | 7/2010 |
| CN | 103218865 A | 7/2013 |
| CN | 104537738 A | 4/2015 |
| CN | 105049209 A | 11/2015 |
| CN | 106131179 A | 11/2016 |
| CN | 106600775 A | 4/2017 |
| CN | 106887064 A | 6/2017 |
| CN | 106898064 A | 6/2017 |
| CN | 106971442 A | 7/2017 |
| CN | 107016756 A | 8/2017 |
| CN | 107248918 A | 10/2017 |
| CN | 107481373 A | 12/2017 |

(Continued)

OTHER PUBLICATIONS

Extended European Search Report in the European Application No. 19212426.1 dated Jun. 2, 2020.

(Continued)

*Primary Examiner* — Nader Bolourchi
(74) *Attorney, Agent, or Firm* — Finnegan, Henderson, Farabow, Garrett & Dunner, L.L.P.

(57) ABSTRACT

A method for controlling an entrance guard, includes: determining a dynamic password generation algorithm consistent with a smart door lock; starting running the dynamic password generation algorithm, and triggering the smart door lock to run the dynamic password generation algorithm; and after receiving password generation request information, determining a current dynamic password.

18 Claims, 5 Drawing Sheets

(56) References Cited

FOREIGN PATENT DOCUMENTS

| | | |
|---|---|---|
| CN | 107633588 A | 1/2018 |
| CN | 107845169 A | 3/2018 |
| CN | 108777015 A | 11/2018 |
| JP | 2007025802 A | 2/2007 |
| JP | 2007034974 A | 2/2007 |
| KR | 101555885 B1 | 9/2015 |
| KR | 20170101156 A | 9/2017 |
| RU | 2506637 C2 | 2/2014 |
| RU | 2016108315 A | 9/2017 |
| WO | WO 2016/161889 A1 | 3/2016 |

OTHER PUBLICATIONS

International Search Report of Chinese Application No. PCTCN2019/108552 dated Apr. 24, 2020.
First Office Action of Russian Application No. 2019138524/07 dated Jun. 16, 2020.
Notification of Reason for Refusal dated Mar. 30, 2021, from Intellectual Property Office of Korea in counterpart Korean Application No. 10-2019-7032603.
English version of International Search Report of Chinese Application No. PCT/CN2019/108552 dated Apr. 24, 2020.

\* cited by examiner

METHOD AND APPARATUS FOR CONTROLLING ENTRANCE GUARD

CROSS-REFERENCE TO RELATED APPLICATIONS

The present application is based upon and claims priority to Chinese Patent Application No. 201910689792.0, filed on Jul. 29, 2019, the entirety of which is incorporated herein by reference.

TECHNICAL FIELD

The present disclosure relates to the technical field of mobile terminals, and in particular, to a method and an apparatus for controlling an entrance guard.

BACKGROUND

Smart door locks controlled by mobile terminals are becoming more and more widely used. When the owner is not at home, a solution for the visitor when needing to open the smart door lock is: when the visitor needs to enter the owner's home, the owner sends a password to a mobile terminal of the visitor through a network connection (including a gateway, a router, etc.); and after obtaining the password, the visitor enters the password in the smart door lock.

SUMMARY

The present disclosure provides a method and an apparatus for controlling an entrance guard.

According to a first aspect of the embodiments of the present disclosure, there is provided a method for controlling an entrance guard, applied to a first mobile terminal, the method including: determining a dynamic password generation algorithm consistent with a smart door lock; starting running the dynamic password generation algorithm, and triggering the smart door lock to run the dynamic password generation algorithm; and receiving password generation request information and determining a current dynamic password.

According to a second aspect of the embodiments of the present disclosure, there is provided a method for controlling an entrance guard, applied to a smart door lock, the method including: determining a dynamic password generation algorithm consistent with a first mobile terminal; receiving a trigger signal from the first mobile terminal and starting running the dynamic password generation algorithm; and receiving a door open request, determining a current dynamic password as a door open password, controlling the entrance guard to be opened when a password in the door open request is the same as the door open password.

According to a third aspect of the embodiments of the present disclosure, there is provided an apparatus for controlling an entrance guard, the apparatus including: a processor; and a memory for storing instructions executable by the processor; wherein the processor is configured to: determine a dynamic password generation algorithm consistent with a smart door lock; start running the dynamic password generation algorithm and trigger the smart door lock to run the dynamic password generation algorithm; and receive password generation request information and determine a current dynamic password.

The technical solutions provided by the embodiments may include the following beneficial effects: when the owner of the door lock is not at home, a temporary door lock key can be remotely assigned to the visitor for one time, thereby achieving the effect that the visitor can be temporarily authorized to unlock the lock; and the security of the password is effectively guaranteed, the password is not easy to be stolen, and the security performance of the smart door lock is improved.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
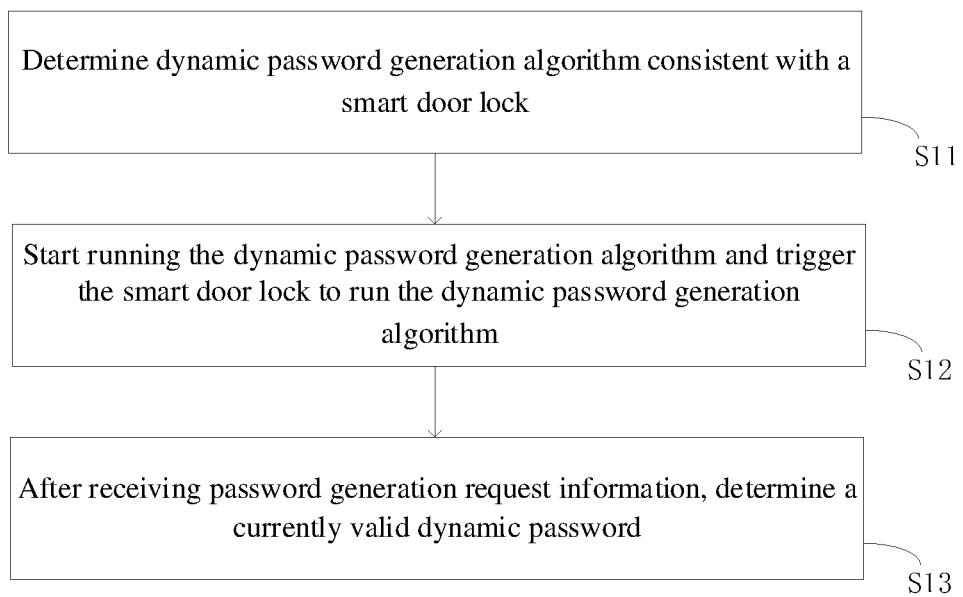
FIG. 1 is a flow chart showing a method for controlling an entrance guard according to an exemplary embodiment.

FIG. 1 is a flowchart of a method for controlling an entrance guard according to an exemplary embodiment. The method is applied to a first mobile terminal, and includes the following steps.

In step S11, a dynamic password generation algorithm consistent with a smart door lock is determined.

In step S12, the dynamic password generation algorithm starts running and the smart door lock is triggered to run the dynamic password generation algorithm.

In step S13, after receiving password generation request information, a currently valid dynamic password is determined.

For example, an applicable scenario of the method is: the owner's home has a smart door lock installed, and the visitor needs to open the smart door lock to enter the owner's home when the owner is not at home. Accordingly, the owner obtains a dynamic password for opening the door on the first mobile terminal and notifies the dynamic password to the visitor, and then the visitor uses this dynamic password to open the smart door lock.

In an embodiment, a smart door lock control application (APP) runs on the first mobile terminal, and before using this method, the first mobile terminal is bound to the smart door lock using this APP.

In an embodiment, the entrance guard may be implemented using hardware, or software, or a combination of hardware and software. For example, each of the smart door lock and the smart door lock control APP may be a part of the entrance guard.

After the step S13, the method further includes notifying the determined dynamic password to a second mobile terminal. The notification may be performed by the following manners: the owner gives a call through the first mobile terminal or uses other instant messaging software to send the determined dynamic password to the second mobile terminal of the visitor, or after the first mobile terminal determines the currently valid dynamic password, the first mobile terminal automatically sends the currently valid dynamic password to the second mobile terminal.

The dynamic password generation algorithm is an algorithm for synchronizing based on a target, which is time or event. The following descriptions are made by two application manners in which the target is the time and the event respectively.

First Application Manner

When the dynamic password generation algorithm is based on time synchronization, before starting running the dynamic password generation algorithm, the method further includes: performing time calibration with the smart door lock.

The time calibration with the smart door locks is performed by one of the following manners.

In a first manner, a current time of the smart door lock is set to a current time of the first mobile terminal.

For example, the current time of the first mobile terminal is 10:30:00, and the current time of the smart door lock is 10:25:00, then the time of the smart door lock is set to be the same as the time of the first mobile terminal, that is, the time of the smart door lock is set to 10:30:00.

In a second manner, the current time of the first mobile terminal is set to the current time of the smart door lock.

For example, the current time of the first mobile terminal is 10:30:00, and the current time of the smart door lock is 10:25:00, then the time of the first mobile terminal is set to be the same as the time of the smart door lock, that is, the time of the first mobile terminal is set to 10:25:00.

In a third manner, a time difference between the first mobile terminal and the smart door lock is recorded.

For example, the current time of the first mobile terminal is 10:30:00, and the current time of the smart door lock is 10:25:00. The time difference between the first mobile terminal and the smart door lock is recorded as 5 minutes. This dynamic password generation algorithm may generate a new password every 10 minutes. After recording the time difference between the first mobile terminal and the smart door lock as 5 minutes, the first mobile terminal starts the dynamic password generation algorithm from 10:30:00 and generates a new password every 10 minutes, and the smart door lock starts the dynamic password generation algorithm from 10:25:00 and generates a new password every 10 minutes. The frequency of the first mobile terminal and the smart door lock for updating the dynamic password is consistent.

In the first application manner, the ways for generating the dynamic password in the dynamic password generation algorithm includes one of the following ways.

In a first way, a dynamic password is generated at a fixed time interval from a time point when the dynamic password generation algorithm starts running.

In a second way, a time when the dynamic password generation algorithm starts running is used as a start time point, a time node sequence including the start time point is generated, and a dynamic password is generated at a time corresponding to each time node in the time node sequence. The time intervals of adjacent time nodes in the time node sequence may be the same or different. When the time intervals of adjacent time nodes in the time node sequence are different, the time intervals of adjacent time nodes are arranged according to a certain arrangement rule. For example, the arrangement rule is increasing sequentially and decreasing sequentially, where the manner of increasing or decreasing is linear or non-linear, or according to a function rule.

Second Application Manner

When the dynamic password generation algorithm is based on event synchronization, the event is a door lock manipulation event, such as a door lock open event, a password input error event in the door lock, and a door lock keyboard mis-press event.

The dynamic password generation algorithm also performs an operation using an additional seed value. For example, determining the dynamic password generation algorithm consistent with the smart door lock in step S11 includes: sending the additional seed value of the dynamic password generation algorithm to the smart door lock, the additional seed value including an identification of the first mobile terminal. This identification is a unique identification of the identity of the first mobile terminal. For example, the unique identification of the first mobile terminal is a number of a mobile card embedded in the mobile terminal, or a Mobile Equipment Identifier (MEID) or the like.

Figure 2:
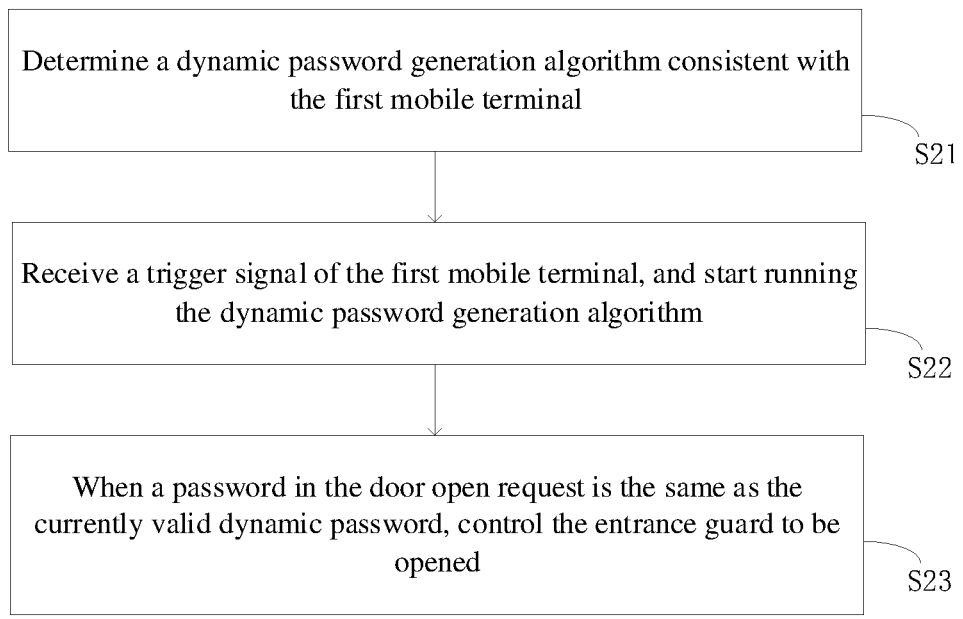
FIG. 2 is a flow chart showing a method for controlling an entrance guard according to an exemplary embodiment.

FIG. 2 is a flowchart of a method for controlling an entrance guard according to an exemplary embodiment. The method is applied to a smart door lock, and includes the following steps.

In step S21, a dynamic password generation algorithm consistent with the first mobile terminal is determined.

In step S22, a trigger signal of the first mobile terminal is received, and the dynamic password generation algorithm starts running.

In step S23, a door open request is received, a currently valid dynamic password is determined as a door open password; when a password carried in the door open request is the same as the door open password, the entrance guard is controlled to be opened.

When the dynamic password generation algorithm is based on time synchronization, before starting running the dynamic password generation algorithm, the method further includes: performing time calibration with the first mobile terminal.

The time calibration with the first mobile terminal is performed by one of the following ways:

setting a current time of the smart door lock as a current time of the first mobile terminal;

setting a current time of the first mobile terminal as a current time of the smart door lock;

recording a time difference between the first mobile terminal and the smart door lock.

When the dynamic password generation algorithm is based on event synchronization, the event is a door lock manipulation event, such as a door lock open event, a password input error event in the door lock, and a door lock keyboard mis-press event.

The method further includes: receiving a seed value of the dynamic password generation algorithm from the first mobile terminal, the seed value being an identification of the first mobile terminal.

For example, an application scenario is: a smart door lock is installed in the owner's home, and the visitor needs to open the smart door lock to enter the owner's home when the owner is not at home. The owner uses the first mobile terminal and the visitor uses the second mobile terminal. The method will be described in detail by using different specific examples in this application scenario.

In an embodiment, the first mobile terminal negotiates with the smart door lock to determine a dynamic password generation algorithm; the dynamic password generation algorithm is based on time synchronization, and generates a dynamic password at a fixed time interval, e.g., every 10 minutes. In the embodiment, the current time of the first mobile terminal is 10:30:00, and the current time of the smart door lock is 10:25:00. The time calibration is performed to set the current time of the first mobile terminal to the current time of the smart door lock, so that the time on the first mobile terminal and the time on the smart door lock are the same, both 10:25:00.

At the current time, the dynamic password generation algorithm is run at the first mobile terminal and simultaneously the smart door lock is triggered to run the dynamic password generation algorithm. Both the first mobile terminal and the smart door lock generate a dynamic password A1 at 10:25:00, generate a dynamic password A2 at 10:35:00, and generate a dynamic password A3 at 10:45:00.

The visitor arrives at the owner's home at 10:50:00, and the owner clicks a password generating button on the smart door lock control APP of the first mobile terminal, then the first mobile terminal determines that the currently valid dynamic password is A3, and automatically sends the dynamic password to the second mobile terminal through, e.g., instant messaging software. After the visitor views the dynamic password through the second mobile terminal, the visitor enters the dynamic password on the smart door lock. After receiving the door open request including the dynamic password A3, the smart door lock determines that the currently valid dynamic password is A3, and determines that the dynamic password included in the door open request and the currently valid dynamic password are the same, and then controls the entrance guard to be opened.

In an embodiment, the first mobile terminal negotiates with the smart door lock to determine a dynamic password generation algorithm; the dynamic password generation algorithm is based on time synchronization, and generates a dynamic password at a fixed time interval, e.g., every 10 minutes. The current time of the first mobile terminal is 10:30:00, and the current time of the smart door lock is 10:25:00. The time calibration is performed, and the time difference between the first mobile terminal and the smart door lock is recorded as 5 minutes.

The dynamic password generation algorithm is executed at the first mobile terminal and simultaneously the smart door lock is triggered to run the dynamic password generation algorithm.

The first mobile terminal generates a dynamic password A1 at 10:30:00, generates a dynamic password A2 at 10:40:00, and generates a dynamic password A3 at 10:50:00.

The smart door lock generates a dynamic password A1 at 10:25:00, generates a dynamic password A2 at 10:35:00, and generates a dynamic password A3 at 10:45:00.

The visitor arrives at the owner's home at time 10:55:00 of the first mobile terminal, and the owner clicks the password generating button on the smart door lock control APP of the first mobile terminal, then the first mobile terminal determines that the currently valid dynamic password is A3, and automatically sends the dynamic password to the second mobile terminal through, e.g., instant messaging software. After the visitor views the dynamic password through the second mobile terminal, the visitor enters the dynamic password on the smart door lock. After receiving the door open request including the dynamic password A3, the smart door lock determines that the currently valid dynamic password is A3, determines that the dynamic password included in the door open request and the currently valid dynamic password are the same, and then controls the entrance guard to be opened.

In an embodiment, the first mobile terminal negotiates with the smart door lock to determine a dynamic password generation algorithm; the dynamic password generation algorithm is based on event synchronization, and the event is a smart door lock open event.

The first mobile terminal is bound to the smart door lock. The first mobile terminal negotiates with the smart door lock to determine a dynamic password generation algorithm, and the dynamic password generation algorithm uses the number of times the smart door lock is normally opened as the synchronization target.

After the first mobile terminal and the smart door lock both start the dynamic password generation algorithm, each time the smart door lock is normally opened, the smart door lock notifies the first mobile terminal of this event, and both the first mobile terminal and the smart door lock record the number of times of the opening events of the smart door lock, and regenerate the dynamic password based on this number of times.

The smart door lock was opened at 9 am on January 1st. Then, the smart door lock notifies the first mobile terminal of this event, and the smart door lock records the number of times of the opening events of the smart door lock as 10. After receiving the notification of this event, the first mobile terminal records the number of times of the opening events of the smart door lock as 10. The first mobile terminal and the smart door lock generate the same dynamic password B using the dynamic password generation algorithm according to this number of times.

The visitor arrives at the owner's home at 10 am on January 1st. The owner clicks the password generating button on the smart door lock control APP of the first mobile terminal, and the first mobile terminal determines that the currently valid dynamic password is B, and automatically sends this dynamic password to the second mobile terminal through, e.g., instant messaging software. After viewing the dynamic password through the second mobile terminal, the visitor enters the dynamic password on the smart door lock. After receiving the door open request containing the dynamic password B, the smart door lock determines that the currently valid dynamic password is B, determines that the dynamic password included in the door open request and the currently valid dynamic password are the same, and controls the entrance guard to be opened.

The smart door lock notifies the first mobile terminal of the event, and the smart door lock records the number of times of the opening events of the smart door lock as 11. After receiving the notification of this event, the first mobile terminal records the number of times of the opening events of the smart door lock as 11.

In an embodiment, a prompt displayed on a screen of the entrance guard for a user to input the password; and the smart door lock is unlocked if the input password matches the currently valid dynamic password.

Figure 3:
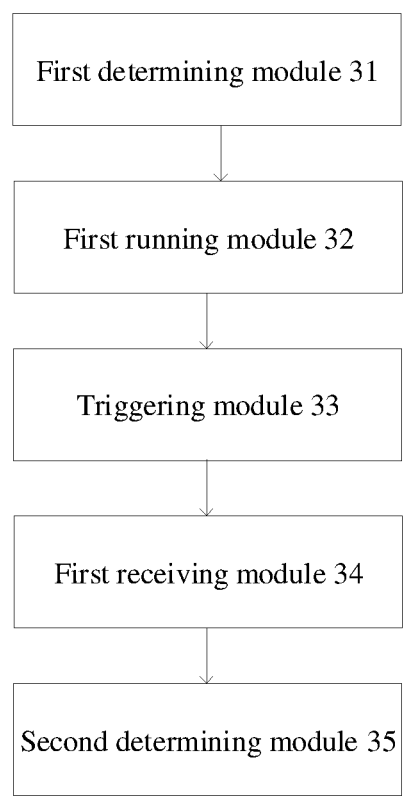
FIG. 3 is a block diagram of an apparatus for controlling an entrance guard according to an exemplary embodiment.

FIG. 3 is a block diagram of an apparatus for controlling an entrance guard according to an exemplary embodiment. The apparatus is applied to a first mobile terminal, and includes: a first determining module 31 configured to determine a dynamic password generation algorithm consistent with the smart door lock; a first running module 32 configured to run the dynamic password generation algorithm; a triggering module 33 configured to trigger the smart door lock to run the dynamic password generation algorithm when starting running the dynamic password generation algorithm; a first receiving module 34 configured to receive password generation request information; and a second determining module 35 configured to determine a currently valid dynamic password.

In an embodiment, the apparatus further includes: a sending module configured to send the currently valid dynamic password to the second mobile terminal.

In an embodiment, the apparatus further includes: a first calibration module configured to perform time calibration with the smart door lock using one of the following ways:
setting a current time of the smart door lock as a current time of the first mobile terminal;
setting a current time of the first mobile terminal as a current time of the smart door lock;
recording a time difference between the first mobile terminal and the smart door lock.

The way for generating the dynamic password in the dynamic password generation algorithm is one of the following ways:
generating a dynamic password at a fixed time interval from a time point when the dynamic password generation algorithm starts to run;
using a time when starting running the dynamic password generation algorithm as a start time point, generating a time node sequence including the start time point, and generating a dynamic password at a time corresponding to each time node in the time node sequence.

When the dynamic password generation algorithm is based on event synchronization, the event is a door lock manipulation event.

The first determining module 31 is further configured to determine the dynamic password generation algorithm consistent with the smart door lock by using the following method: sending an additional seed value of the dynamic password generation algorithm to the smart door lock, the additional seed value including the identification of the first mobile terminal.

Figure 4:
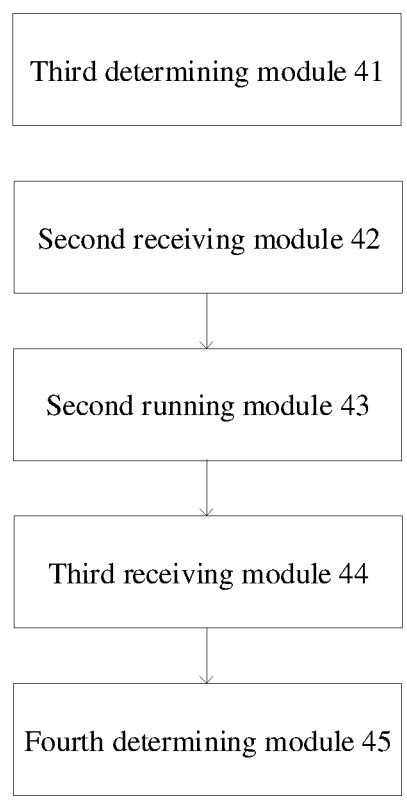
FIG. 4 is a block diagram of an apparatus for controlling an entrance guard according to an exemplary embodiment.

FIG. 4 is a block diagram of an apparatus for controlling a door lock according to an exemplary embodiment. The apparatus is applied to a smart door lock, and includes: a third determining module 41 configured to determine a dynamic password generation algorithm consistent with the first mobile terminal; a second receiving module 42 configured to receive a trigger signal of the first mobile terminal; a second running module 43 configured to start running the dynamic password generation algorithm after receiving a trigger signal of the first mobile terminal; a third receiving module 44 configured to receive a door open request; and a fourth determining module 45 configured to determine a currently valid dynamic password.

In an embodiment, the apparatus further includes: a control module configured to use the currently valid dynamic password as a door open password, and when a password carried in the door open request is the same as the door open password, control the entrance guard to be opened.

In an embodiment, the apparatus further includes: a second calibration module configured to perform time calibration with the first mobile terminal using one of the following manners:
setting a current time of the smart door lock as a current time of the first mobile terminal;
setting a current time of the first mobile terminal as a current time of the smart door lock;
recording a time difference between the first mobile terminal and the smart door lock.

When the dynamic password generation algorithm is based on event synchronization, the event is a door lock manipulation event.

The third determining module 41 is further configured to determine the dynamic password generation algorithm consistent with the first mobile terminal by using the following method: receiving an additional seed value of the dynamic password generation algorithm from the first mobile terminal, the additional seed value including the identification of the first mobile terminal.

Figure 5:
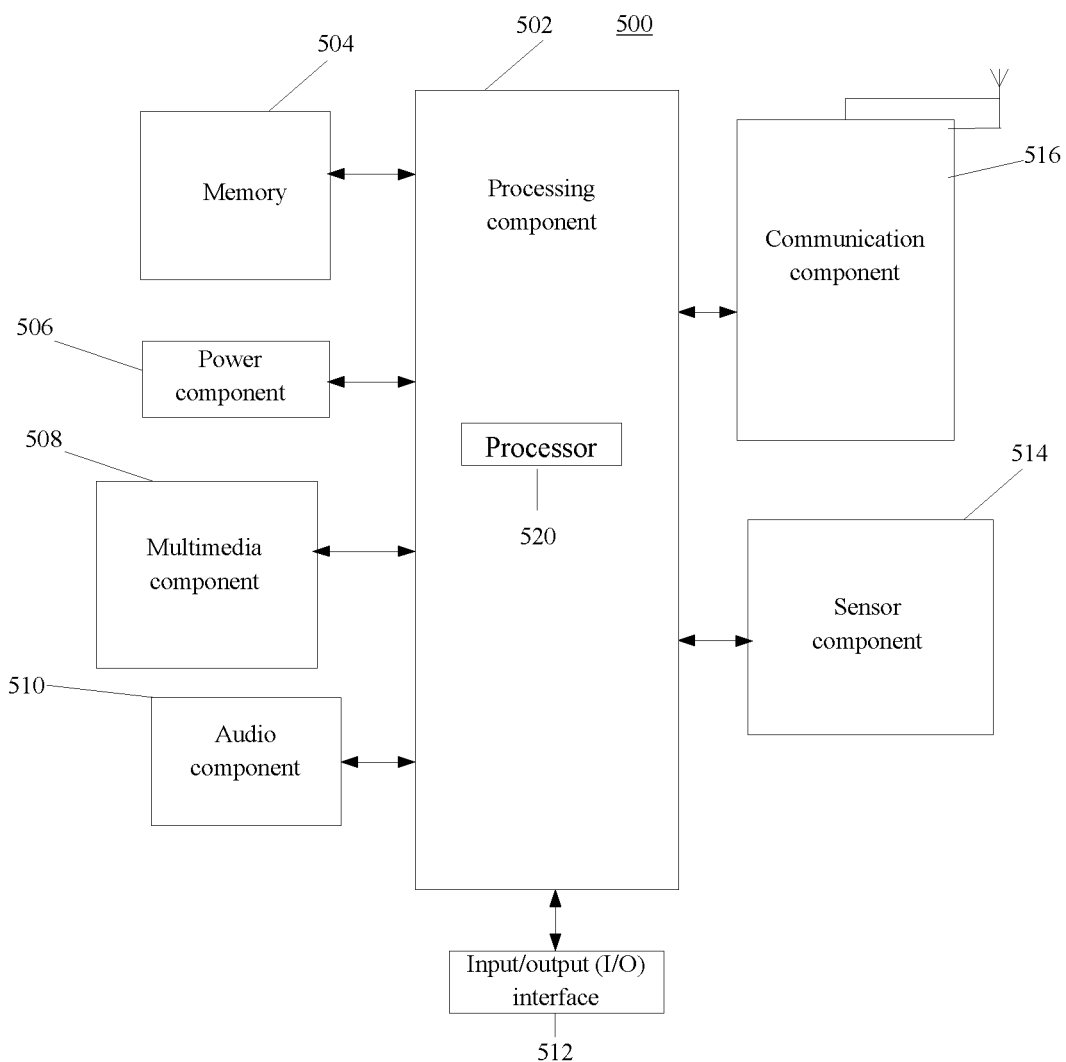
FIG. 5 is a block diagram of an apparatus for controlling an entrance guard according to an exemplary embodiment.

FIG. 5 is a block diagram of an apparatus 500 for controlling opening of an entrance guard according to an exemplary embodiment. As shown in FIG. 5, the apparatus 500 may be a mobile phone, a computer, a digital broadcast terminal, a messaging device, a gaming console, a tablet, a medical device, exercise equipment, a personal digital assistant, and the like.

Referring to FIG. 5, the apparatus 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the apparatus 500, such as the operations associated with display, telephone calls, data communications, camera operations, and recording operations. The processing component 502 may include one or more processors 509 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 505 and the processing component 502.

The memory 504 is configured to store various types of data to support the operation of the apparatus 500. Examples of such data include instructions for any applications or methods operated on the apparatus 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the apparatus 500. The power component 506 may include a power management system, one or more power sources, and any other components associated with the generation, management, and distribution of power in the apparatus 500.

The multimedia component 508 includes a screen providing an output interface between the apparatus 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 505 includes a front camera and/or a rear camera. The front camera and the rear camera may receive an external multimedia datum while the apparatus 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone ("MIC") configured to receive an external audio signal when the apparatus 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the apparatus 500. For instance, the sensor component 514 may detect an open/closed status of the apparatus 500, relative positioning of components, e.g., the display and the keypad, of the apparatus 500, a change in position of the apparatus 500 or a component of the apparatus 500, a presence or absence of user contact with the apparatus 500, an orientation or an acceleration/deceleration of the apparatus 500, and a change in temperature of the apparatus 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the apparatus 500 and other devices. The apparatus 500 can access a wireless network based on a communication standard, such as WiFi, 4G, or 5G, or a combination thereof. In one exemplary embodiment, the communication component 516 receives a broadcast signal or broadcast associated information from an external broadcast management system via a broadcast channel In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 504, executable by the processor 520 in the apparatus 500, for performing the above-described methods. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for controlling an entrance guard, performed by a first mobile terminal, comprising:
   determining a dynamic password generation algorithm consistent with a smart door lock;
   starting running the dynamic password generation algorithm, and triggering the smart door lock to perform the dynamic password generation algorithm, wherein the dynamic password generation algorithm is based on synchronization between the first mobile terminal and the smart door lock;
   receiving password determination request information and determining a current dynamic password; and
   sending the current dynamic password to a second mobile terminal.

2. The method according to claim 1, wherein when the dynamic password generation algorithm is based on time synchronization, before starting running the dynamic password generation algorithm, the method further comprises:
   performing a time calibration with the smart door lock by one of:
   setting a current time of the smart door lock as a current time of the first mobile terminal;
   setting a current time of the first mobile terminal as a current time of the smart door lock; or
   recording a time difference between the current time of the first mobile terminal and the current time of the smart door lock.

3. The method according to claim 2, wherein the dynamic password generation algorithm generates a dynamic password by one of:
   generating the dynamic password at a fixed time interval from a time when starting running the dynamic password generation algorithm; and
   using the time when starting running the dynamic password generation algorithm as a start time point, generating a time node sequence comprising the start time point, and generating the dynamic password at a time corresponding to each time node in the time node sequence.

4. The method according to claim 1, wherein when the dynamic password generation algorithm is based on event synchronization, an event for the event synchronization is a door lock manipulation event.

5. The method according to claim 1, wherein determining the dynamic password generation algorithm consistent with the smart door lock comprises:
   sending a seed value of the dynamic password generation algorithm to the smart door lock, the seed value comprising a unique identification of the first mobile terminal.

6. The method according to claim 5, wherein the unique identification of the first mobile terminal is one of a number of a mobile card embedded in the first mobile terminal, or a Mobile Equipment Identifier (MEID).

7. A method for controlling an entrance guard, performed by a smart door lock, comprising:
   determining a dynamic password generation algorithm consistent with a first mobile terminal, wherein the dynamic password generation algorithm is based on synchronization between the first mobile terminal and the smart door lock;
   receiving a trigger signal from the first mobile terminal, and starting running the dynamic password generation algorithm; and
   receiving a door open request, determining a current dynamic password as a door open password, controlling the entrance guard to be opened when a password in the door open request is the same as the door open password.

8. The method according to claim 7, wherein when the dynamic password generation algorithm is based on time synchronization, before starting running the dynamic password generation algorithm, the method further comprises:
   performing a time calibration with the first mobile terminal by one of:
   setting a current time of the smart door lock as a current time of the first mobile terminal;
   setting a current time of the first mobile terminal as a current time of the smart door lock; or
   recording a time difference between the current time of the first mobile terminal and the current time of the smart door lock.

9. The method according to claim 7, wherein when the dynamic password generation algorithm is based on event synchronization, an event for the event synchronization is a door lock manipulation event.

10. The method according to claim 7, wherein determining the dynamic password generation algorithm consistent with the first mobile terminal comprises:
    receiving a seed value of the dynamic password generation algorithm from the first mobile terminal, the seed value comprising an identification of the first mobile terminal.

11. The method according to claim 7, further comprising:
    causing a prompt to be displayed on the entrance guard for a user to input the password;
    wherein the smart door lock is unlocked if the input password matches the current dynamic password.

12. A first mobile terminal for controlling an entrance guard, comprising:
    a processor; and
    a memory for storing instructions executable by the processor;
    wherein the processor is configured to:
    determine a dynamic password generation algorithm consistent with a smart door lock;
    start running the dynamic password generation algorithm and trigger the smart door lock to run the dynamic password generation algorithm, wherein the dynamic password generation algorithm is based on synchronization between the first mobile terminal and the smart door lock;
    after receiving password determination request information, determine a current dynamic password; and
    send the current dynamic password to a second mobile terminal.

13. The first mobile terminal according to claim 12, wherein when the dynamic password generation algorithm is based on time synchronization, before starting running the dynamic password generation algorithm, the processor is further configured to:
    perform a time calibration with the smart door lock by one of:
    setting a current time of the smart door lock as a current time of the first mobile terminal;
    setting a current time of the first mobile terminal as a current time of the smart door lock; or
    recording a time difference between the current time of the first mobile terminal and the current time of the smart door lock.

14. The first mobile terminal according to claim 13, wherein the dynamic password generation algorithm generates a dynamic password by one of:
    generating the dynamic password at a fixed time interval from a time when starting running the dynamic password generation algorithm; and
    using the time when starting running the dynamic password generation algorithm as a start time point, generating a time node sequence comprising the start time point, and generating the dynamic password at a time corresponding to each time node in the time node sequence.

15. The first mobile terminal according to claim 12, wherein when the dynamic password generation algorithm is based on event synchronization, an event for the event synchronization is a door lock manipulation event.

16. The first mobile terminal according to claim 12, wherein in determining the dynamic password generation algorithm consistent with the smart door lock, the processor is further configured to:
    send a seed value of the dynamic password generation algorithm to the smart door lock, the seed value comprising a unique identification of the first mobile terminal.

17. The first mobile terminal according to claim 16, wherein the unique identification of the first mobile terminal is one of a number of a mobile card embedded in the first mobile terminal, or a Mobile Equipment Identifier (MEID).

18. The first mobile terminal according to claim 12, wherein the processor is further configured to:
   cause a prompt to be displayed on the entrance guard for a user to input a password;
   wherein the smart door lock is unlocked if the input password matches the current dynamic password.

* * * * *